(12) United States Patent
Watanabe

(10) Patent No.: US 7,661,333 B2
(45) Date of Patent: Feb. 16, 2010

(54) ROTATION TRANSMISSION MEMBER AND MANUFACTURING METHOD THEREFOR

(75) Inventor: Kenji Watanabe, Nagoya (JP)

(73) Assignee: Advics Co., Ltd., Aichi-Pref. (JP)

( * ) Notice: Subject to any disclaimer, the term of this patent is extended or adjusted under 35 U.S.C. 154(b) by 192 days.

(21) Appl. No.: 11/772,265

(22) Filed: Jul. 2, 2007

(65) Prior Publication Data

US 2008/0016974 A1  Jan. 24, 2008

(30) Foreign Application Priority Data

Jul. 19, 2006  (JP) ............................... 2006-196353

(51) Int. Cl.
*F16H 55/12* (2006.01)
(52) U.S. Cl. ..................... 74/444; 74/443; 264/328.8
(58) Field of Classification Search ............ 74/DIG. 10, 74/443, 444; 264/255, 328.8
See application file for complete search history.

(56) References Cited

U.S. PATENT DOCUMENTS 6,274,074 B1 * 8/2001 Monie ..................... 264/255

7,475,612 B2 * 1/2009 Kaneiwa et al. ............... 74/443

FOREIGN PATENT DOCUMENTS

JP  2003-021223 A  1/2003

* cited by examiner

*Primary Examiner*—David M Fenstermacher
(74) *Attorney, Agent, or Firm*—Sughrue Mion, PLLC

(57) ABSTRACT

A rotation transmission member is composed of a shaft-like metal insert member having a first gear section on the external surface thereof and a resin gear resin-molded on the external surface of one end of the metal insert member and having a second gear section on the external surface thereof. The first gear section is formed almost over the entire length of the metal insert member and provides one end thereof as an insert portion on which the resin gear is to be resin-molded. Thus, it becomes unnecessary to provide a joint portion (the insert portion) between the metal insert member and the resin gear with the machining of any particular shape for preventing the coming-off therebetween.

7 Claims, 4 Drawing Sheets

ROTATION TRANSMISSION MEMBER AND MANUFACTURING METHOD THEREFOR

INCORPORATION BY REFERENCE

This application is based on and claims priority under 35 U.S.C. 119 with respect to Japanese Application No. 2006-196353 filed on Jul. 19, 2006, the entire content of which is incorporated herein by reference.

BACKGROUND OF THE INVENTION

1. Field of the Invention

The present invention relates to a rotation transmission member in which a resin gear is molded by insert molding on the external surface of one end of a gear section formed almost over the entire length of a metal insert member. It also relates to a method of manufacturing the rotation transmission member.

2. Discussion of the Related Art

Automotive parts often use resin gear sections for rotation transmission at parts of a rotation transmission device. Such resin gear sections are useful because they can damp rotation vibration in a rotation transmission train to enhance quietness. Generally, a resin gear section is bodily joined by resin molding or the like with the external surface of a cylindrical metal member, wherein it is required that the resin gear section does not fall or come off the metal member even when loads act on the resin gear section in the circumferential direction as well as in the axial direction.

To this end, in the prior art described in, e.g., Japanese Unexamined, Published Patent Application No. 2003-21223, a part of resin material is filled in cutouts or holes formed on a metal part (metal member) at the time of the injection molding of the resin gear section, so that the resin gear section can be prevented from falling or coming off the metal member even when loads act on the resin gear section in the circumferential direction as well as in the axial direction.

Because the technology described in the aforementioned prior art is of the method that a part of resin material is filled in the cutouts or holes formed on the metal part (metal member) at the time of the injection molding of the resin gear section, there arises a problem that the technology cannot be utilized for a rotation transmission member which does not have any cutout or hole on the metal part.

For this reason, it may be conceived that as shown in FIG. 7, a shape machining section 4 such as knurling or serration is machined on an insert portion 3 of a metal member 2 which section is to have a resin gear section 1 resin-molded thereon, to prevent the resin gear section 1 and the metal member 2 from falling or coming off each other.

However, where the metal member 2 constitutes a gear section 5 for rotation transmission as is the case of FIG. 7, it becomes necessary to machine the gear section 5 for rotation transmission and the shape machining section (knurling or serration) 4 for coming-off prevention separately on the external surface of the metal member 2. These are distinctive machinings, thereby increasing in machining steps as well as in part cost.

SUMMARY OF THE INVENTION

Accordingly, it is a primary object of the present invention to provide an improved rotation transmission member and a manufacturing method therefor in which the machining of any particular shape for the purpose of preventing the falling-off or the coming-off is not required on a joint portion (insert portion) of a metal insert member with a resin gear.

Briefly, according to the present invention, there is provided a rotation transmission member, which comprises a shaft-like metal insert member having a first gear section on the external surface thereof and a resin gear resin-molded on the external surface of one end of the metal insert member and having a second gear section on the external surface thereof. The first gear section is formed almost over the entire length of the metal insert member and provides one end thereof as an insert portion on which the resin gear is to be resin-molded.

With this configuration, the first gear section formed almost over the entire length of the metal insert member provides one end thereof as the insert portion on which the resin gear having the second gear section is to be resin-molded. Thus, any particular machining which serves to prevent the resin gear from coming off the metal insert member becomes unnecessary, so that it can easily be realized to obtain the rotation transmission member which is possible to reduce the machining cost.

In another aspect of the present invention, there is provided a method for manufacturing a rotation transmission member which is composed of a shaft-like metal insert member having a first gear section on the external surface thereof and a resin gear resin-molded on the external surface of one end of the first gear section and having a second gear section on the external surface thereof. The method comprises the steps of machining the first gear section almost over the entire length of the metal insert member and an annular groove on the external surface of an insert portion which is at one end of the first gear section for the resin gear to be resin-molded thereon, and then forming the resin gear by insert molding by injecting resin into a forming mold with the insert portion being inserted into the forming mold.

With this construction, the first gear section is machined almost over the entire length of the metal insert member, and the annular groove is machined on the external surface of the insert portion being at the one end of the first gear section on which portion the resin gear having the second gear is to be resin-molded. Then, the resin gear is formed by insert molding by injecting resin into the forming mold with the insert portion being inserted into the forming mold. Therefore, any particular machining which serves to prevent the resin gear from coming off the metal insert member becomes unnecessary, so that it can easily be realized to obtain the rotation transmission member which is possible to reduce the machining cost.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

First Embodiment

Figure 1:
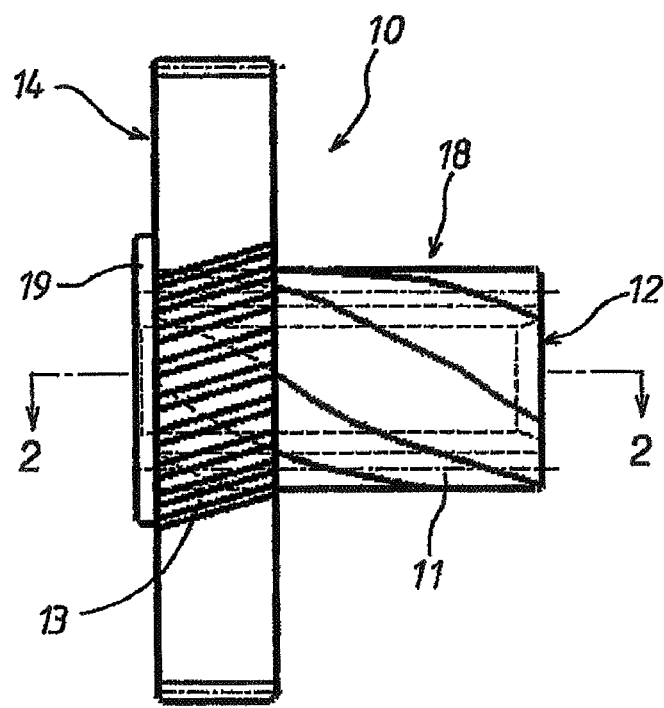
FIG. 1 is an exterior view of a rotation transmission member in a first embodiment according to the present invention.
Figure 2:
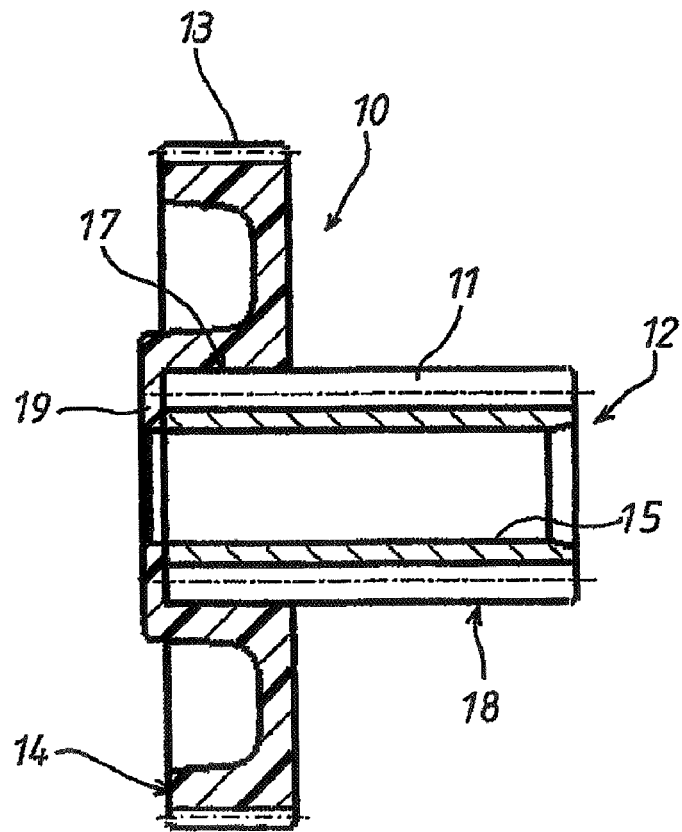
FIG. 2 is a longitudinal sectional view of the rotation transmission member taken along the line 2-2 in FIG. 1.

Hereafter, a rotation transmission member (i.e., gear) in a first embodiment according to the present invention will be described with reference to FIGS. 1 and 2. The rotation transmission member 10 is composed of a shaft-like metal insert member 12 having a first gear section 11 formed as helical gear and a resin gear 14 having a second gear section 13 formed as helical gear. The resin gear 14 is resin-molded by insert molding on the external surface of one end of the metal insert member 12 and is formed bodily with the same.

The metal insert member 12 has a through hole 15 on its center axis and has the first gear 11 formed helically on the external surface over the entire length thereof. The metal insert member 12 defines an insert portion 17 on which the resin gear 14 is resin-molded by insert molding, at one axial end thereof and also defines a gear transmission portion 18 at the other axial end thereof.

The resin gear 14 takes the shape of a disc, which has an axial length sufficiently shorter than the axial length of the metal insert member 12 and which has an outer diameter sufficiently larger than the outer diameter of the metal insert member 12. The resin gear 14 is made by mixing thermoplastic polyacetal resin with glass fiber of several weight percents and has outstanding capacities for thermal resistance as well as for wear resistance. On the external surface of the resin gear 14, the second gear section 13 is formed to be a helical shape which is opposite to the first gear section 11 in helical direction. At one axial end of the resin gear 14, there is formed a plinth 19 for covering one end surface of the metal insert member 12, and a flange portion of a thrust washer (not shown) is held in contact with the plinth 19. The thrust washer has a cylindrical support portion which is fitted in the through hole 15 of the metal insert member 12. A support shaft (not shown) which passes through the through hole 15 is fitted in the cylindrical support portion, whereby the metal insert member 12 can be supported rotatably on the support shaft.

Figure 3:
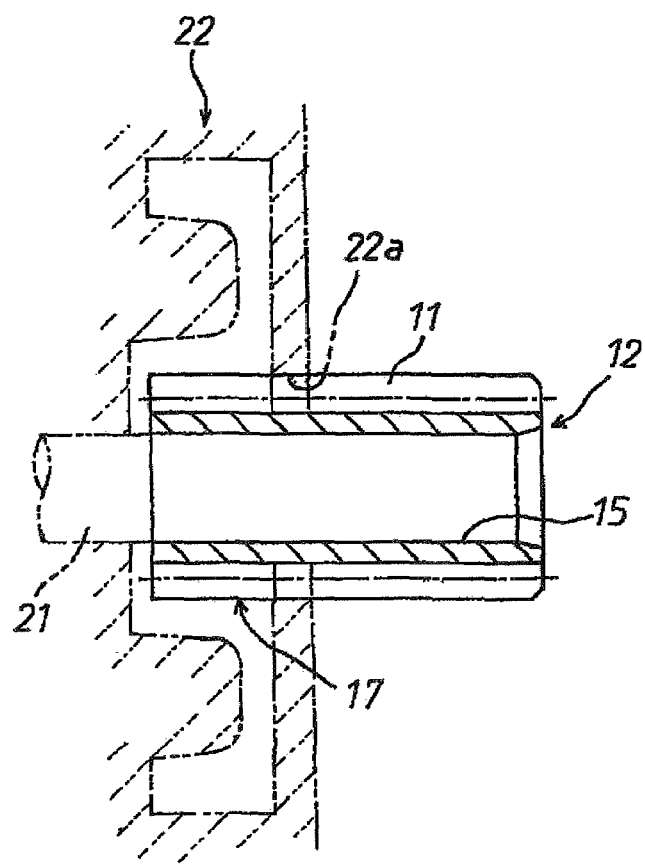
FIG. 3 is a sectional view illustrating a manufacturing method for the rotation transmission member.

The rotational transmission member 10 can be manufactured as follows. That is, a helical gear (the first gear section) is machined beforehand on the external surface of the metal insert member 12 over the entire length thereof, and a shaft 21 is then inserted into the through hole 15 of the metal insert member 12, as shown in FIG. 3. Then, the insert portion 17 defined at one end of the helical gear 11 is inserted as an insert assembly into a forming mold 22, and resin is injected into the forming mold 22, whereby the resin gear 14 is resin-molded by insert molding bodily on the external surface of one end of the metal insert member 12. The forming mold 22 has a helical engagement portion 22a which is engageable with the insert portion 17 formed as the helical gear 11, and the insert portion 17 can be inserted by screwing the metal insert member 12 into the forming mold 22. Although not shown in FIG. 3, as well known in the art, the forming mold 22 is composed of two or more mold segments which include a body segment and an end cover segment having the helical engagement portion 22, whereby upon completion of molding, the resin gear 14 can be taken out of the forming mold 22 by separating the end cover segment from the body segment. Instead, there may be used a forming mold which is composed of two or more radially dividable segments.

In the foregoing embodiment, the resin gear 14 is formed by insert molding on the insert portion 17 which is a part of the helical gear 11 formed on the external surface of the metal insert member 12. Thus, the helical gear 11 serves to restrict relative rotation between the metal insert member 12 and the resin gear 14 and also serves to prevent them from coming off each other in the axial direction, whereby the metal insert member 12 and the resin gear 14 are joined bodily. That is, where the rotation of the first gear section 11 applies a thrust force in one direction only to the metal insert member 12, the falling-off or the coming-off can be prevented reliably by the helical gear 11 only. Also where the thrust forces in opposite directions are applied on the metal insert member 12, by securing a sufficient axial dimension of the insert portion 17, it becomes possible for the helical gear 11 only to obtain a strength which is necessary to prevent the falling-off or coming-off.

In this manner, by utilizing a part of the helical gear (the first gear section) 11 which constitutes the gear transmission portion 18, as the insert portion 17 on which the resin gear 14 is to be formed by insert molding, there can be excluded any particular shape machining (e.g., knurling or serration) which may otherwise be required for the purpose of preventing the resin gear 14 from falling or coming off. Further, the insert portion 17 and the gear transmission portion 18 can be machined through a single gear forming operation, so that the machining cost can be reduced by the decrease of the machining steps.

The foregoing rotation transmission member 10 may be operated as, for example, a rotation transmission gear member for speed reduction. That is, the gear member 10 is meshed at the second gear section 13 of the resin gear 14 with a drive pinion (not shown) drivingly rotated by a motor (not shown) and is meshed at the first gear section 11 of the metal insert member 12 with a driven gear (not shown), so that the rotation of the drive pinion by the motor is transmitted to the driven gear at a reduced speed. In this form of use, the resin gear 14 damps the rotational vibration to improve the quietness during rotation transmission.

Second Embodiment

Figure 4:
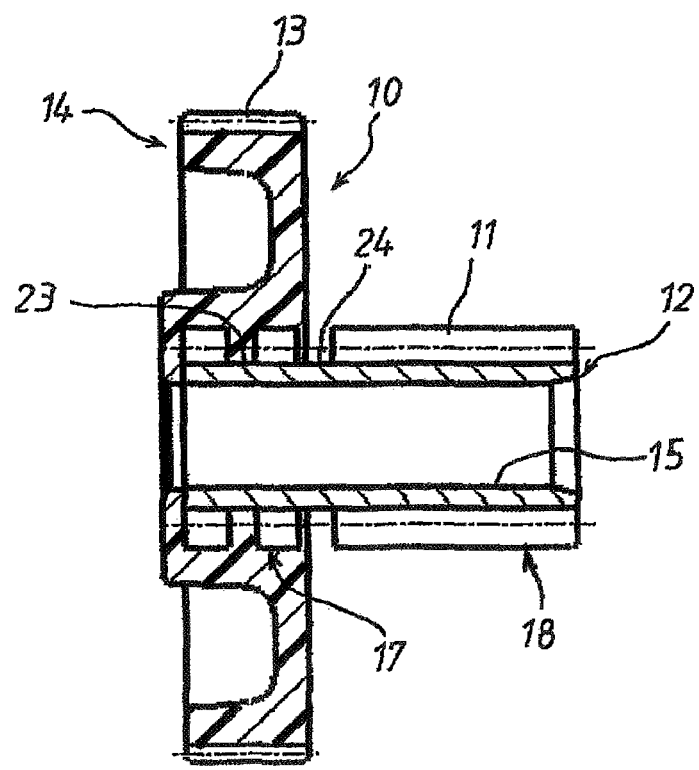
FIG. 4 is a longitudinal sectional view of a rotation transmission member in a second embodiment according to the present invention.

FIG. 4 shows a rotation transmission member in a second embodiment according to the present invention. The same components in the second embodiment as those in the foregoing first embodiment are designated by the same reference numerals, and description of such same components will be omitted for the sake of brevity. The rotation transmission member 10 in the second embodiment is increased in its strength against the coming-off of the resin gear 14 relative to the metal insert member 12. More specifically, in the second embodiment, after the first gear section 11 is helically machined on the external surface of the metal insert member 12 over the entire axial length thereof, the insert member 12 is machined to have a first annular groove 23 at about the middle in the axial direction of the insert portion 17. The insert member 12 is further machined to have a second annular groove 24 between the insert portion 17 and the transmission gear portion 18. When the resin-molding is performed for the resin gear 14, a part of the forming mold 22 shown in FIG. 3 is engaged with the second annular groove 24. Therefore, by the use of the forming mold 22 composed of split or dividable segments, the resin gear 14 is resin-molded on the insert portion 17 with the same being held by the forming mold 22 at the second annular groove 24. Preferably, two or more radially dividable segments may be employed to construct the forming mold 22 in this particular embodiment.

According to the second embodiment, at the time of resin-molding for the resin gear 14, resin is filled into the first annular groove 23, and hence, the strength of preventing the resin gear 14 from coming off the metal insert member 12 can be increased greatly even in the case that a large axial dimension cannot be secured on the insert portion 17. Further, by the provision of the second annular groove 24, it becomes possible to close the forming mold 22 tight easily and reliably.

Third Embodiment

Figure 5:
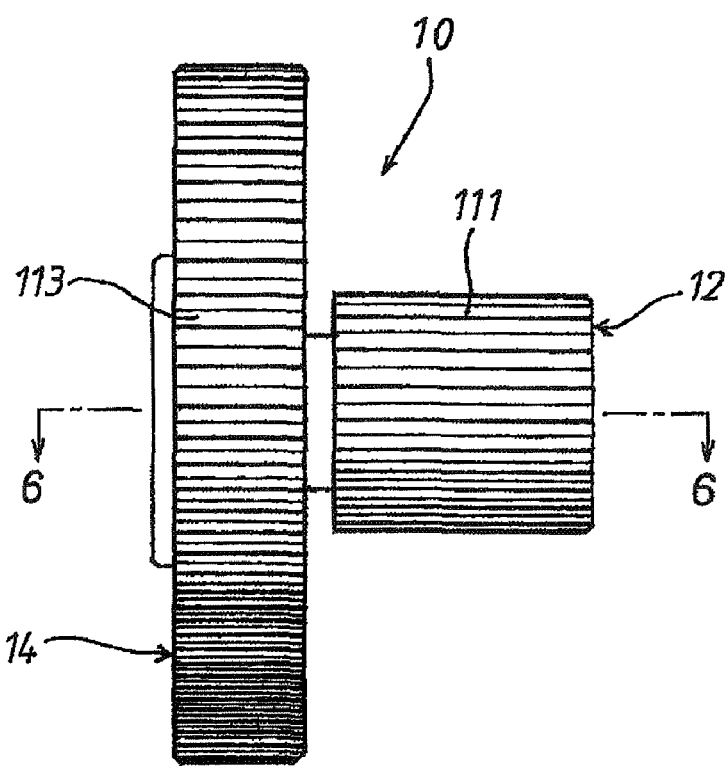
FIG. 5 is an exterior view of a rotation transmission member in a third embodiment according to the present invention.
Figure 6:
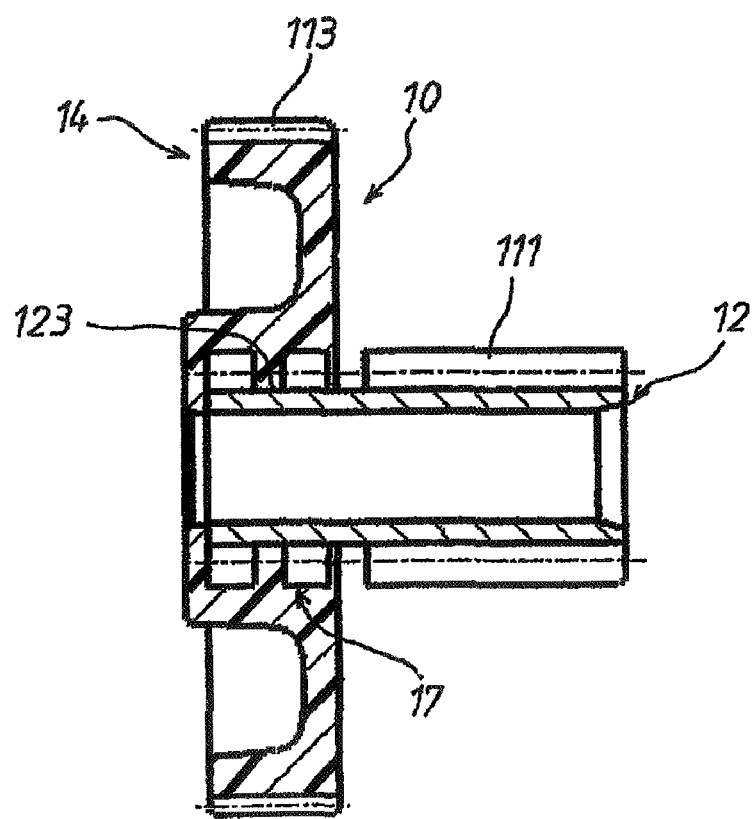
FIG. 6 is a longitudinal sectional view of the rotation transmission member taken along the line 6-6 in FIG. 5.
Figure 7:
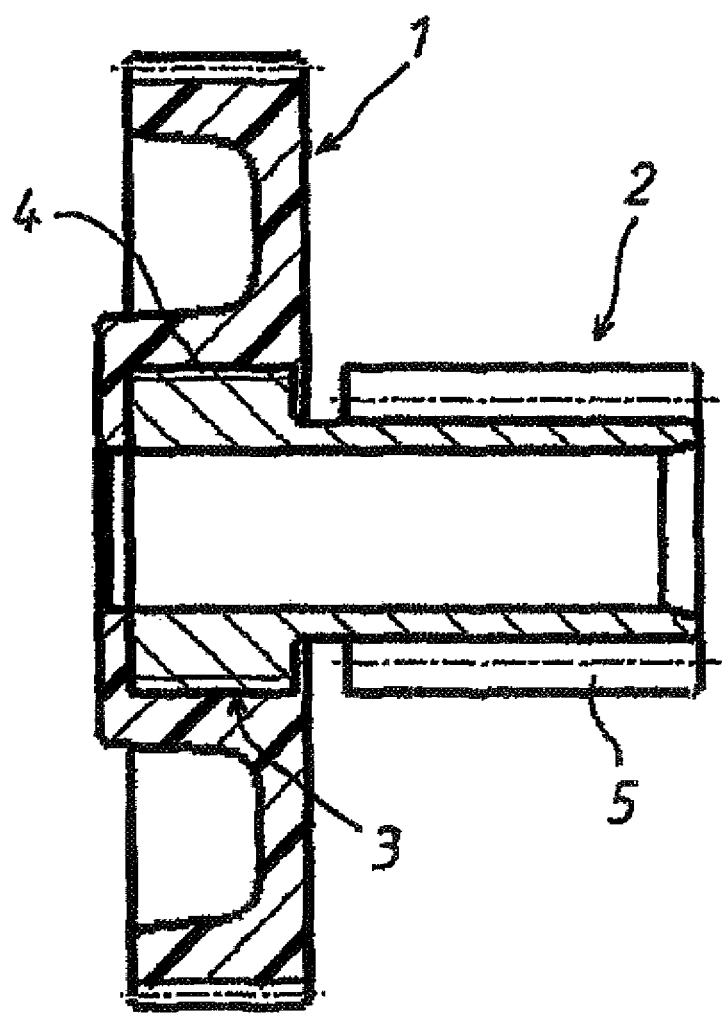
FIG. 7 is a sectional view showing one example of a prior art rotation transmission member.

FIGS. 5 and 6 show a rotation transmission member in a third embodiment according to the present invention. In the third embodiment, spur gears are formed as the first and second gear sections 111, 113 which are provided on the metal insert member 12 and the resin gear 14, respectively. The first gear section 111 is provided with an annular groove 123 similar to that in the foregoing second embodiment, at the axial mid position of the insert portion 17. By means of the annular groove 123, it can be ensured to prevent the resin gear 14 from coming off the metal insert member 12.

Where the first and second gear sections 111, 113 are formed as super gears, the rotation hardly applies any substantial load in the thrust direction on the metal insert portion 12 and the resin gear 14. Thus, only by resin-molding the resin gear 14 on the insert portion 17 of the gear section 111 formed as super gear without particularly providing any annular groove on the first gear section 111, it can be realized to bodily joint the resin gear 14 with the metal insert member 12.

According to the third embodiment, since the resin gear 14 is resin-molded on the insert portion 17 which is formed as the super gear 111 formed on the external surface of the metal insert member 12, the machining of any particular shape (e.g., knurling or serration) for prevention of the coming-off or the separation becomes unnecessary as is the same as in the foregoing first embodiment.

Each of the foregoing embodiments has been described by way of an example wherein the first gear section 11, 111 and the second gear section 13, 113 are constituted as helical gears or super gears. However, in a modified form, one of the first and second gear sections may be a helical gear, whereas the other of those may be a super gear.

Further, in the foregoing embodiments, the first gear section 11 is machined on the metal insert member 12 over the entire length of the same, and then, the annular groove 23 is machined on the external surface of one end (the insert portion 17) of the first gear section 11 on which the resin gear 14 is to be resin-molded. However, in another modified form, the annular groove 23 may be machined on the external surface of the insert portion 17 prior to the machining of the first gear section 11.

Although each of the foregoing embodiments has been described by way of an example wherein the first gear section 11, 111 is formed on the metal insert member 12 over the entire length of the same, the gear section 11, 111 is not required to be formed literally over the entire length of the metal insert member 12. The meaning of "almost over the entire length" as defined in certain claims is intended to encompass a modification that for example, a narrow or slight cylindrical portion which does not have the first gear section 11, 111 formed thereon is formed at one end or a part of the insert portion 17 or the transmission gear portion 18.

Obviously, numerous further modifications and variations of the present invention are possible in light of the above teachings. It is therefore to be understood that within the scope of the appended claims, the present invention may be practiced otherwise than as specifically described herein.

What is claimed is:

1. A gear comprising:
    a shaft-like metal insert member having a first gear section on the external surface thereof; and
    a resin gear resin-molded on the external surface of one end of the metal insert member and having a second gear section on the external surface thereof;
    wherein the first gear section is formed almost over the entire length of the metal insert member and one end of the first gear section is an insert portion on which the resin gear is resin-molded;
    wherein the first gear section includes an exposed portion provided at another end of the first gear section, the exposed portion configured for mating with another gear; and
    wherein a shape of the insert portion and a shape of the exposed portion are the same, the insert portion and the exposed surface portion being formed by the same shape machining.

2. The gear relation as set forth in claim 1, wherein the first gear section is formed as helical gear.

3. The gear as set forth in claim 2, wherein the first gear section forming the insert portion is provided at the external surface of one end thereof with an annular groove which serves to prevent the first gear section and the resin gear from coming off each other in the axial direction.

4. The gear as set forth in claim 1, wherein:
    the first gear section and the second gear section are respectively constituted by super gears; and
    the first gear section is provided on the insert portion thereof with an annular groove which serves to prevent the first gear section and the resin gear from coming off each other in the axial direction.

5. A method of manufacturing a gear which is composed of a shaft-like metal insert member having a first gear section on the external surface thereof and a resin gear resin-molded on the external surface of one end of the first gear section and having a second gear section on the external surface thereof, the method comprising the steps of:
    machining the first gear section almost over the entire length of the metal insert member and an annular groove on the external surface of an insert portion which is provided at one end of the first gear section for the resin gear to be resin-molded thereon; and
    then forming the resin gear by insert molding by injecting resin into a forming mold with the insert portion being inserted into the forming mold.

6. A method of manufacturing the gear as set forth in claim 1, the method comprising the steps of:
    machining the first gear section almost over the entire length of the metal insert member and an annular groove on the external surface of an insert portion which is provided at one end of the first gear section for the resin gear to be resin-molded thereon; and
    then forming the resin gear by insert molding by injecting resin into a forming mold with the insert portion being inserted into the forming mold.

7. The gear as set forth in claim 2, wherein the second gear is formed as helical gear that is opposite to the first gear in the helical direction.

* * * * *